May 12, 1970

J. M. ANDREWS ET AL 3,511,433

UNITARY FOAM SHEET CONTAINER

Filed March 13, 1968

INVENTORS
JAMES M. ANDREWS &
JAMES R. PATTON
BY *William G. Kratz, Jr.*
their
Agent United States Patent Office 3,511,433
Patented May 12, 1970

3,511,433
UNITARY FOAM SHEET CONTAINER
James M. Andrews and James R. Patton, Pittsburgh, Pa., assignors to Sinclair-Koppers Company, a partnership of Delaware
Filed Mar. 13, 1968, Ser. No. 712,812
Int. Cl. B65d 5/66, 1/00
U.S. Cl. 229—44                              3 Claims

ABSTRACT OF THE DISCLOSURE

A unitary foam polystyrene container is provided which can be formed from a single sheet of foam plastic material in one step and which provides insulation to protect hot foodstuffs from loss of heat while simultaneously permitting the escape of moisture from the closed container or on the foodstuff. The container comprises a unitary cover and tray portion interconnected by a hinge or fold line and provides for the securing of the cover to the tray portion in a manner which permits excess moisture to escape from the container.

BACKGROUND OF THE INVENTION

The insulating properties of foam polystyrene are well known. Numerous applications of this excellent insulating material to packaging processes have been suggested. Often, in the transfer of hot foodstuffs, excess moisture or condensed steam tends to collect in a tightly closed container and results in the foodstuffs, for example, hot sandwiches, becoming soggy and unappetizing. Many containers also require a large amount of storage space and, for shipment of containers from factory to the user, compactness of such containers is a necessity.

The object of the present invention is to provide a polystyrene foam container suitable for compact shipping before use and having a means for permitting the escape of excess moisture from said container when hot foodstuffs are transported therein without losing the benefits of the polystyrene foam insulating properties.

SUMMARY OF THE INVENTION

In accordance with the present invention, there is provided a compact container formed from a single sheet of foam polystyrene. The container comprises a unitary tray portion suitable for the transporting of hot foodstuffs therein, having outwardly extending flanges at each of the sidewall terminations, and a cover portion having the walls thereof terminating in a marginal area comprising outwardly extending flanges, which is interconnected with the tray portion by a hinge or fold line to permit the ready opening and closing of the container. The flanges or marginal area of the cover and tray portions opposite the hinge contain locking means which permits the frictional locking of the cover in a closed positon while maintaining a small opening or space between the cover and tray flanges for the escape of excess moisture.

The objects and novel features of the invention are described by the following detailed description when the same is read in connection with the accompanying drawings. It is to be expressly understood, however, that the drawings are not intended as a definition of the invention, but for the purposes of illustration only.

BRIEF DESCRIPTION OF THE DRAWINGS

In the drawings wherein like parts are marked alike.

DETAILED DESCRIPTION

Figure 1:
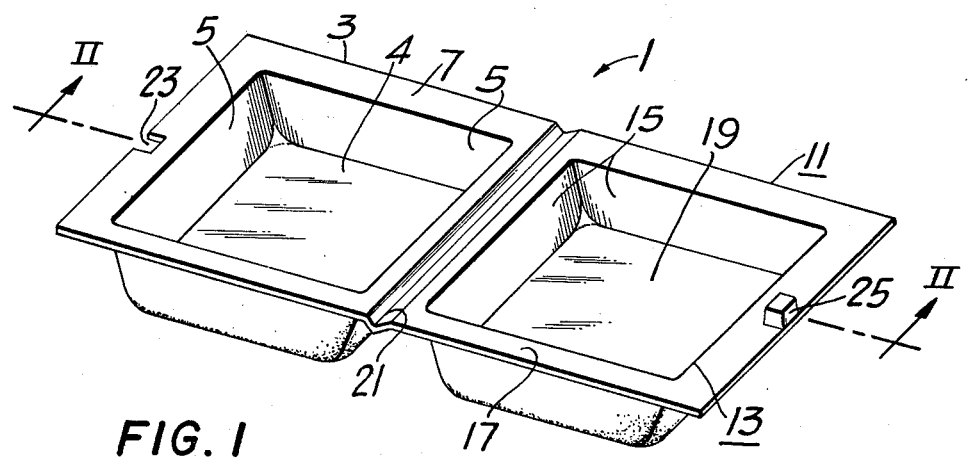
FIG. 1 is a perspective view of an embodiment of the container of the invention in open position.

Referring now to FIG. 1, there is illustrated the unitary container 1 having a tray portion 3 and a cover portion 11. The tray portion 3 has a bottom 4 and upwardly and outwardly extending interconnected walls 5. The upwardly and outwardly extending side walls 5 delimit an open upper surface 9, as is better seen by referring to FIG. 2, and terminate in the marginal area of the tray portion as outwardly substantially horizontally extending flanges 7.

Figure 2:
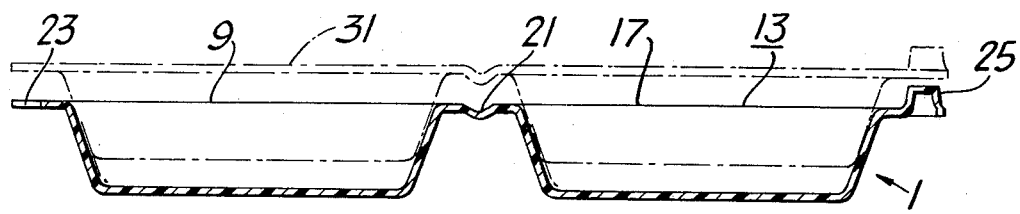
FIG. 2 is a partial cross-sectional view taken along lines II—II of FIG. 1 and also shows how such containers in open position can be stacked to conserve storage space.

The cover portion 11 of the container is comprised of a top 13 and downwardly and outwardly extending interconnected walls 15 which delimit a bottom lower surface 19, as better seen in FIG. 2. The walls 15 terminate in the marginal area of the cover portion as outwardly and substantially horizontally extending flanges 17. The unitary container comprising the tray portion 3 and cover portion 11, being formed from a single sheet of polystyrene foam sheet material are interconnected by an integral hinge 21, intermediate the ends of the sheet, which connects a flange 7 of the tray portion and a flange 17 of the cover portion. The hinge 21 is readily formed from said interconnected flanges 7, 17, by a roller, creasing rule, or other such known apparatus. The container, being formed from foam plastic material provides a hinge which can be readily opened and closed a number of times because of the resiliency of the foam material.

On the flange 7 of the marginal area of the tray portion opposite the integral hinge 21 is an aperture or cut-out portion 23 which serves as part of the locking or holding means of this container. On the flange 17 of the cover portion is a tapered projection or tab 25 positioned on the flange so that when the tray and cover portions are brought into closed relationship, the projection 25 is in cooperating or engaging relationship with the aperture 23.

Figure 3:
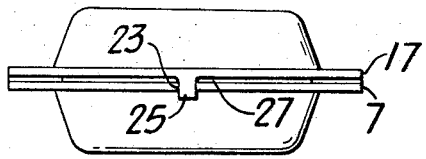
FIG. 3 is a front view of the container of FIG. 1 in closed position showing the opening provided for escape of excess moisture.

An important aspect of the present invention lies in the dimensions of the tapered projection 25 and aperture 23. The tapered projection 25 should be, at the point closest to flange 17, larger than the aperture 23. Thus, when the tapered projection and aperture are brought into cooperating relationship, on closing of the container, the tapered projection 25 will fit snugly in the aperture, and because of the resiliency of the foam plastic material will be frictionally held thereby. Because of the flexible properties of foam polystyrene sheet, the projection and aperture, when engaged, will flex to permit sealing and will exert slight outward pressure to frictionally secure the tray and cover portions. The flanges 7 and 17 or marginal areas adjacent the holding means will not, however, be in contact with each other in entirety, but rather a space or opening 27, as shown in FIG. 3, will be formed which permits the escape of excess moisture or condensation from within the container. Thus, what results is the substantial contact of flanges 7 and 17 from the hinge to the vicinity of the aperture and tapered projection holding means to prevent the escape of too much heat from the container, the container being of foam material having excellent insulating properties; but an opening 27 between said flanges in the area of the holding means allows the escape of excess moisture or condensation.

The opening or space 27, is formed between juxtaposed flanges 7 and 17. Because these flanges extend substantially horizontally and are juxtaposed, there is no great loss of heat from the container interior, the flanges forming the slot which acts in the nature of a mutual zone between the heated interior and the cool exterior of the container. The slot does, however, permit the escape of condensation or excess moisture so as to prevent the foodstuff from being damaged by such moisture.

The compactness of the container for the purpose of storage or shipping is shown in FIG. 2, where there is illustrated the container 1 in open relationship and a second such container 31 in position on stacking the two containers 1 and 31. Any number of such containers can be stacked by placing them in mating relationship in open position. Although the thickness of the foam material may prevent close mating of a plurality of such containers, the great bulk of the containers, the tray and lid portions, do conform and result in the saving of considerable storage or shipping space.

Figure 6:
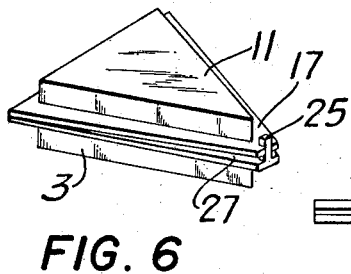
FIG. 6 is a perspective view of another embodiment of the invention having a triangular form.

In the FIGS. 1 and 2, the projection 25 is shown on flange 17 of the cover portion 11, and the aperture 23 on flange 7 of the tray portion 3. It is, of course, another embodiment of the invention to have the projection 25 positioned on the flange 7 of the tray portion 3 and the aperture 23 positioned on flange 17 of the cover portion 11 without varying from the invention. This embodiment is illustrated in FIG. 6 showing a triangular shaped embodiment of the container of the invention.

Figure 4:
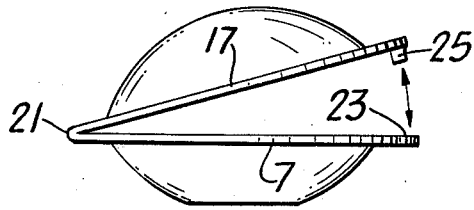
FIG. 4 is a side elevational view of another embodiment of the present invention having a rounded configuration.
Figure 5:
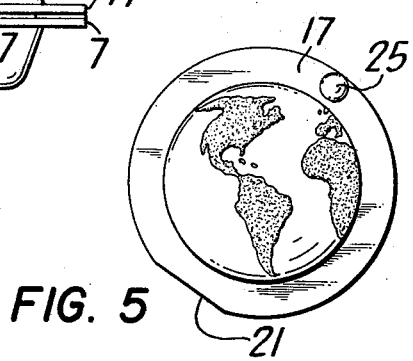
FIG. 5 is a top view of the container of FIG. 4 showing some aesthetic and advertising qualities rendered usable by the container.

A further embodiment of the present invention is illustrated in FIG. 4. This embodiment, having a rounded configuration, is formed by having the upwardly and outwardly extending side walls of a curved configuration so that the interconnections of the walls are less evident from their appearance. In addition, the top of the cover part is also rounded so as to result in a rounded configuration of the overall container. The outwardly and substantially horizontally extending flanges 7 and 17 on the tray position and cover portion are interconnected by the hinge 21 while the holding means, projection 25 and aperture or slot 23 permit the closing and frictional locking of the container while maintaining an opening or space at the position of the locking means to permit escape of excess moisture. The ready availability of the decorative or advertising qualities of the container are illustrated in FIG. 5 which shows a container similar to that of FIG. 4 having a design, such as by embossing or printing, of the earth's description and use of the locking means, projection 25 in a rounded, tapered configuration to signify the moon in orbit. It is, of course, obvious that other shapes may be utilized to vary the novel effect of the container.

The material used to form the container is foam polystyrene sheet. Foam polystyrene sheet, because of its resiliency, provides for frictional sealing of the tray and cover portions through use of projection 25 and aperture 23. Also, foam polystyrene is an excellent insulating material and will maintain the contents of the container at the desired temperature for a long period of time. It is, of course, possible to coat or line the interior of the tray and cover portions with other materials, if desired.

The polystyrene sheet material from which the container is made can be of varying thickness. Generally, the polystyrene foam sheet can be in the range of 10–100 mils thickness. The actual thickness would depend upon the end use of the container. The specific dimensions of the container are, of course, also dependent upon the end use thereof. The container can be formed by using conventional techniques such as heat forming, vacuum forming, etc. Suitable such techniques are known in the art. Exemplary of such techniques are those described in Koppers Technical Bulletin, Thermoforming Foam Polystyrene Sheet and Polystyrene Laminates, Bulletin C-9-273, chapter 4c, Apr. 15, 1952.

There has been described a novel unitary container which can be formed from foam polystyrene sheet material in a single forming step. The container provides insulation for hot foodstuffs while permitting the escape of excess moisture or condensate therefrom. The container configurations can be adapted to numerous novel and pleasing shapes. In addition, the containers, when not in use, can be stacked for storage without provision for a large storage area.

What is claimed is:
1. A unitary container formed from a continuous sheet of foam polystyrene material comprising:
 (a) a tray portion;
 (b) a cover portion;
 (c) a hinge portion integrally connecting together said cover and tray portions; with
 (d) said tray portion having
  (i) a bottom and side walls that terminate in a
  (ii) substantially planar flange around the periphery of said walls, a portion of said flange constituting said hinge; with
 (e) said cover portion having
  (i) a top and side walls that terminate in a
  (ii) peripheral flange, a portion of which constitutes said hinge, said peripheral flange being planar and having an opening therein located opposite said hinge; and
 (f) a protrusion on the flange portion of said tray located opposite said hinge, said protrusion being of such a size that, when said cover is disposed over said tray and when said protrusion coacts with said opening, a space is formed between the cover and tray flange portions adjacent said protrusion and said opening.
2. The invention of claim 1 wherein:
 (a) said protrusion frictionally coacts with said opening to secure said cover portion over said tray portion.
3. The invention of claim 1 wherein:
 (a) said opening is in the flange of said cover at a location opposite said hinge; and
 (b) said protrusion is on the flange of said tray at a location opposite said hinge.

References Cited
UNITED STATES PATENTS

| | | | |
|---|---|---|---|
| 1,945,013 | 1/1934 | Wilson | 229—2.5 |
| 2,915,214 | 12/1959 | Frankel | 229—2.5 XR |
| 2,917,216 | 12/1959 | Despres | 229—2.5 |
| 2,932,301 | 4/1960 | Tabara | 229—2.5 XR |
| 2,974,842 | 3/1961 | Reifers | 229—29 XR |
| 3,107,783 | 10/1963 | Corey et al. | 220—31 XR |
| 3,145,896 | 8/1964 | Reifers et al. | 229—29 XR |
| 3,148,103 | 9/1964 | Gallagher | 229—2.5 XR |
| 3,307,765 | 3/1967 | Trimble | 229—2.5 |
| 3,410,698 | 11/1968 | Sosin | 229—44 XR |

D. T. MOORHEAD, Primary Examiner

U.S. Cl. X.R.
220—31; 229—2.5